United States Patent [19]

Skinner et al.

[11] Patent Number: 4,478,513
[45] Date of Patent: Oct. 23, 1984

[54] OPTICAL SYSTEM FOR A SPECTROPHOTOMETER

[75] Inventors: David R. Skinner; Rex A. Stokes; Lewis O. Freeman, all of Victoria, Australia; Alan R. McNeill, Boroko, Papua New Guinea

[73] Assignee: Commonwealth of Australia, Canberra, Australia

[21] Appl. No.: 349,702

[22] Filed: Feb. 18, 1982

[30] Foreign Application Priority Data

Feb. 24, 1981 [AU] Australia .................... PE7726

[51] Int. Cl.³ .......................... G01J 3/08; G01J 3/42
[52] U.S. Cl. ........................ 356/323; 350/172
[58] Field of Search ............. 356/300, 319, 323–325, 356/144–146; 350/502, 541, 542, 557, 172, 174

[56] References Cited

U.S. PATENT DOCUMENTS

3,749,494  7/1973  Hodges ................... 350/557
4,168,910  9/1979  Barnard ................... 356/325

FOREIGN PATENT DOCUMENTS

414400   6/1925  Fed. Rep. of Germany.
938271   1/1956  Fed. Rep. of Germany.
1423598  1/1969  Fed. Rep. of Germany.
1431857  4/1976  United Kingdom.
721719   3/1980  U.S.S.R. .................. 356/325

OTHER PUBLICATIONS

Sid'ko et al., *J. Appl. Spectroscopy*, vol. 29, No. 5, Nov. 1978, pp. 1412–1416.

Primary Examiner—F. L. Evans
Attorney, Agent, or Firm—Robert F. O'Connell

[57] ABSTRACT

This invention relates to an optical system which will enable easy use in the field. Known systems either require sample and reference targets to be imaged within the same telescope field or do not enable accurate identification of the measuring field in a view finder.

The present invention overcomes this problem by providing a system having a first branch (10, 12) and a second branch (14) which receive light from a sample and reference target respectively. A shutter 22 sequentially allows light from the two branches to pass to a mirror 20 having a slit 30, reflective portions 32 and transparent portions 34. Light from the first branch passes through portions 30 and 34 to a detecting branch (42, 46, 50–56) and some light is reflected through a lens 16 to eye piece 19. Similarly some light from the second branch passes through mirror 30 and 34 to eye piece 19 and some light is reflected to the detecting branch. Accordingly the measuring field can be accurately identified by looking through the eye piece 19 while at the same time light is directed to the detecting branch for analysis.

10 Claims, 3 Drawing Figures

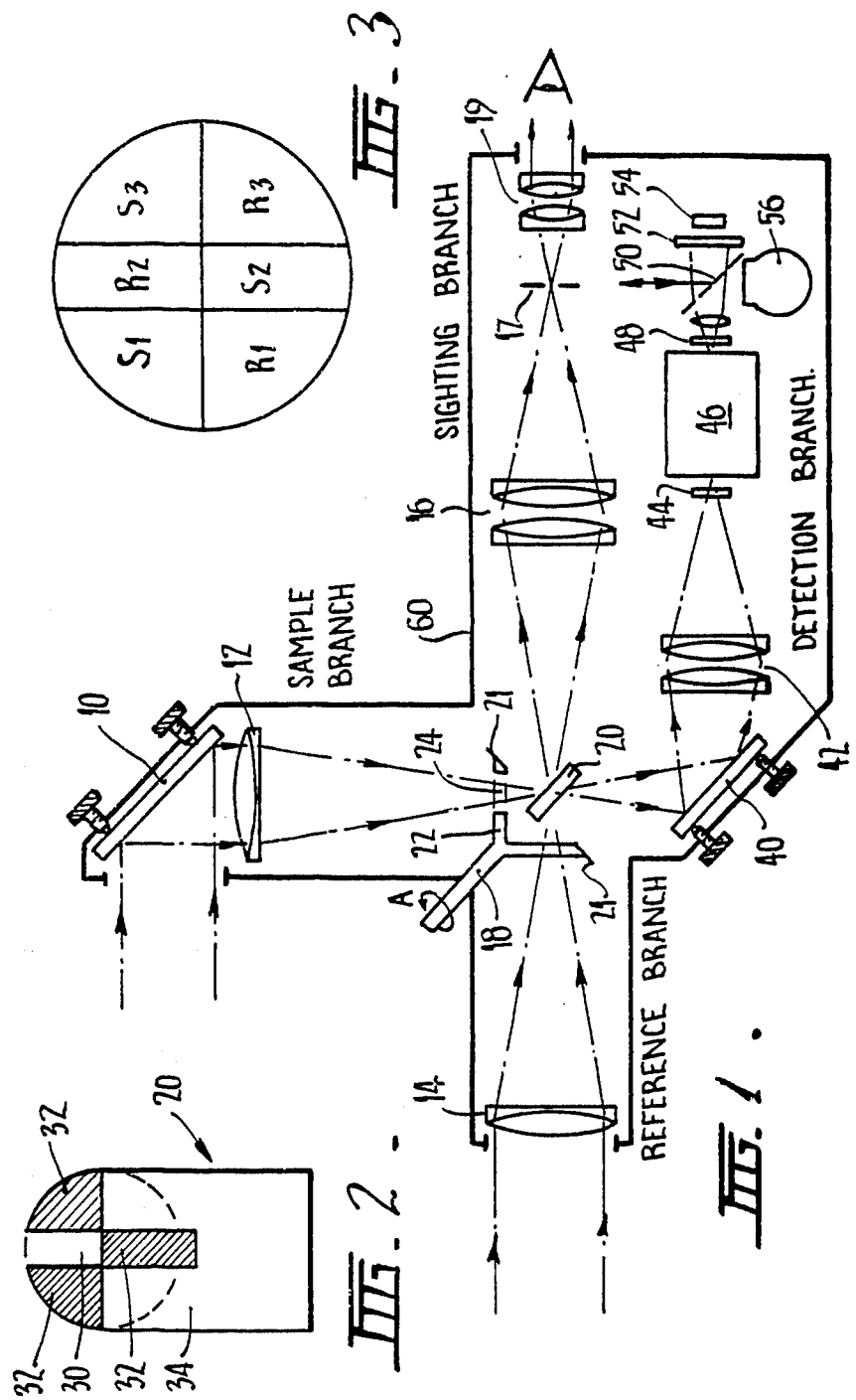

OPTICAL SYSTEM FOR A SPECTROPHOTOMETER

This invention relates to an optical system for a spectrophotometer and in particular to double beam spectrophotometer which can be easily transported for field use.

Measurement of the spectral reflectance of growing vegetation and terrain features has obvious relevance to fields of applied science such as land-use survey and camouflage. Methods used in the past fall roughly into three categories, namely photogrammetric, multi-spectral survey and spectrophotometric, each of which has its disadvantages. Photogrammetric methods suffer from inadequate spectral range, sensitivity and accuracy. Multi-spectral survey is generally carried out from a complex and costly installation in a satellite or aircraft, and gives insufficient data and image resolution for some purposes (e.g. colour measurements on individual trees). Spectrophotometric methods involving internal light sources are usuable only for the very small areas of ground or for individual leaves brought into the laboratory. The only spectrophotometer using ambient lighting and remote imaging techniques known to us which has a double-beam facility requires both the sample and reference targets to be imaged within the same telescope field which is undesirable.

Single beam systems are also known which could possibly be used in the field but such systems suffer from the problems of correctly identifing the measuring field in a viewfinder of the system and it is also necessary to direct the system firstly at a sample, take all the measurements required at the wavelengths of interest and then manually direct the system at a reference target. During the time taken to redirect the system the ambient light may change considerably thereby giving a false reading of, for example, the reflectance of the sample as compared with that of the reference target.

It is the object of the present invention to overcome some or all of these problems.

The present invention may be said to reside in an optical system for a spectrophotometer said system having a first optical branch for forming an image from a sample and a second branch for forming an image from a reference target, a splitter means for directing a portion of said image formed by the first optical branch to an eye piece and to a detecting means and for directing of said image formed by said second optical branch to said eye piece and to said detecting means and a shutter means for sequentially allowing the image formed by the first branch to be received by said splitter means and the image formed by said second branch to be received by said splitter means.

Accordingly the device of the present invention allows a user to direct the first branch at a sample and the second branch at a reference target and uses ambient lighting to receive the sample and references images. The first and second branches can be independently aimed and focused. The shutter means and splitter means allows the image in the first branch to be directed to the eye piece and detecting means so that the sample field can be identified. Since a shutter means is utilized, only a small amount of time elapses between the time the image in the first branch is received by the detector and the image in the second branch is received. Accordingly the first and second branches will be subject to the same illumination for a series of measurements. The first branch may be directed to obtain an image of the foliage of a tree and obtain measurements therefrom directly in the field and thereby provide an accurate indication of the spectral reflectance of a reasonably sized area from which to evaluate types of camouflage or the like.

In a preferred embodiment of the invention the splitter means comprises a segmented mirror, the segmented mirror having a slit therein and portions which are reflective and other portions which are transparent. The mirror is arranged so that the portion of the mirror image in the first branch received at the detecting means passes through the said slit so that the image is not affected by the mirror. The reflective portion of the mirror directs a part of the image in the first branch to the eye piece. A portion of the image in the second branch passes through the transparent parts of the mirror to the eye piece and the remainder of the image is reflected to the detecting means. In this embodiment the sample field will be missing in the eye piece thereby indicating that the image corresponding to the missing area has been directed to the detecting means.

The invention may also be said to reside in a system for collecting light from separate sources said system comprising a first telescope means and a second telescope means, said first and second telescope means having a common primary focus.

The images of the common focus may be directed by a mirror or the like to one or more locations such as an eye piece or a detecting system for inspection or measurement.

The invention may also be said to reside in a mirror for a spectrophotometer, said mirror having:

(a) an aperture therein to allow light to pass through the mirror to a first location;

(b) reflective portions to reflect light to a second location; and (c) transparent portions to allow light to pass through said mirror to said second location;

(d) further reflective portions to reflect light to said first location.

A preferred embodiment of the invention will be described with reference to the accompanying drawings in which:

FIG. 1 is a diagram of an optical system embodying the invention;

FIG. 2 is a view of a segmented mirror used in the system of FIG. 1; and

FIG. 3 is a diagram of the image seen in an eye piece of the system of FIG. 1.

It should be understood that the operation of a spectrophotometer in which the present system may be embodied is well known and accordingly will not be described in full detail herein.

Referring to FIG. 1 the optical system includes a sample branch formed of an aiming mirror 10 and an objective lens 12. A reference branch includes an objective lens 14. An erecting lens 16 and an eye piece 19 are provided and the lens 12 and the lens 16 and eye piece 19 form a first telescope with the lenses 14 and 16 and eye piece 19 forming a second telescope. As shown the first and second telescope have a common primary focus. Located at the common primary focus is a segmented mirror 20.

A rotational shutter 18 is provided which is generally cone shaped and is driven by an electric motor (not shown) to rotate as shown by arrow A. As shown the mirror 20 projects into cone 22 of the shutter 18 and the cone 22 is provided with an opening 24 so that as the cone is rotated by the electric motor, light from the lens 12 passes through the opening to mirror 20. Then as the cone continues to rotate there is a period when the mirror 20 receives no light until the opening 24 allows the light from lens 14 to pass therethrough to the mirror 20 and then there is a further period of darkness until the opening again allows light to pass from lens 12 to mirror 20.

Referring now to FIG. 2 which shows the segmented mirror 20, it will be seen that the mirror is provided with a slit 30, two semi-circular portions 32 and one rectangular portion 32 which are aluminised to provide reflecting portions. The remaining portion 34 of the mirror is transparent and is generally rectangular in configuration so that a lower portion 36 may be used to mount the mirror in a desired configuration.

The mirror 20 is mounted such that light passing from lens 12 through the opening 24 is reflected from the aluminized segments 32 and the remainder passes through slit 30 and portion 34 to alignment mirror 40. Accordingly reflected light from the aluminised segment 32 passes through erecting lens 16, rectangular reticle 17 and eye piece 19. The parts of the sample image corresponding to aluminised segments 32 are therefore seen in the eye piece 19. These are the portions $S_1$, $S_2$ and $S_3$ in FIG. 3. The portions $R_1$, $R_2$ and $R_3$ are transmitted to the mirror 40 and will appear black when the opening 24 allows light to pass from lens 12. Light from the lens 14 which passes through opening 24 passes through the transparent portion 34 and slit 30 of the mirror 20 to lens 16 and then to eye piece 19 and the light reflected from the aluminised portions 32 of the mirror 20 is reflected to mirror 40. A user will therefore see the portion of the reference image labeled $R_1$, $R_2$ and $R_3$ in the eye piece 19 with the image corresponding to the portion $S_2$ being reflected to the mirror 40.

Light passing through the transparent portion 34 of mirror 20 from lens 12 is reflected from mirror 40 onto the sides of an entrance slit of monochromator 46 and is absorbed by the sides of the monochromator. Only the light passing through slit 30, which is reflected from mirror 40 enters the monochromator from lens 12 as will be hereinafter described.

With the shutter 18 rotating as shown by arrow A the field of view through eye piece 19 consists of a mosaic of parts of the sample and reference as shown in FIG. 3 with the parts of the image from lens 14 at $S_2$ and the image from lens 12 at $R_2$ being transmitted to mirror 40. These are easily checked by alternately capping the sample and reference objective lenses wherein images will each be observed as semicircles, with missing strips corresponding to the input to the detecting system. The measured field of view is further defined by the rectangular reticle 17.

The mirror 40 is arranged so that light passing through the slit 30 from lens 12 is reflected through relay lens 42, visible order sorting filter 44 to a lower half of the entrance slit in the monochromator 46. Light of particular wavelengths is sequentially obtained from monochromator 46 and passed through an infra-red order sorting filter 48 to a movable mirror 50, an infra-red pass filter 52, cooled lead sulphide detector 54 or to photomultiplier tube 56 as in a conventional spectrophotometer. It should of course be noted that mirror 50 is moved to allow light to pass to the detector 54 or is left in place to direct light to photomultiplier tube 56.

Similarly light from rectangular portion 32 of mirror 20 and lens 14 is reflected to mirror 40 and enters the top half of the entrance slit of monochromator 46 and then to photomultiplier tube 56 or detector 54 in the same manner as described immediately above. The light from the other aluminised portions 32 is reflected by mirror 40 to the sides of the monochromator entrance slit where it is absorbed.

The monochromator is thus provided with an input in a four-part cycle of darkness then reference image from lens 14 then darkness then sample image from lens 12 as in a conventional spectrophotometer.

The spectral information generally required is in the visible and near infra-red spectrum in the range of 380 –800 mm. It should also be noted that the shutter 18 may be provided with small holes (not shown) on flange 21. Photodetectors are arranged to provide synchronizing pulses corresponding to darkness and light as the shutter rotates so that the detecting equipment is able to receive a signal which can be used to distinguish an image from the sample field and the image from the reference target. This would be well known to those familiar with spectrophotometers and will not be described herein.

As would be well understood to prevent ambient light, other than that entering the lenses 12 and 14, from entering the system the system would be located in a housing schematically shown by the reference numeral 60.

In use the spectrophotometer embodying the optical system can be easily transported to a site for use, in the back of a Land Rover or the like. The system would be set up with the mirror 10 directed at a sample target and the lens 14 directed at a reference target. It is desirable to place the reference target within about 5° of the sample target. By placing a lens cap over the lenses 12 and 14 alternatively and with the shutter 18 rotating, a user can ensure correct alignment by merely viewing through the eye piece 19.

Since the paths of the images through the lenses 12 and 14 are different it is desirable to calibrate before use. The first step in calibrating the instrument is to point the lens 14 at a reference point coated with a barium sulphate/ethyl cellulose based white paint. The alignment mirror 10 is used to align the image of lens 12 with the same part of the board, and a scan of wave lengths is made. This calibration scheme gives the ratio of efficiencies of the two paths (reference and sample) for wave lengths of interest. Since the double-beam geometry is constant further calibration scans at the geographic location should not be needed. Calibration ratios are saved as resident calibration data for example in a micro-processor memory.

The bias voltage applied to photomultiplier tube 56 and the amplifier gain of detector 54 may be under micro-processor control to ensure optimum signal to noise ratio for the detection system output over a wide range of viewing conditions. This output can be fed to a microprocessor together with a wavelength signal from the monochromator 46 and synchronizing pulses from the shutter 18. The photodetector output is sampled at 5/nm intervals in the visible range and at 10/nm intervals in the infra-red range. At each wavelength of interest, the first reference synchronizing pulse allows the reference branch output to be sampled four times, summed and stored. The dark synchronizing pulse initiates similar sampling of the output during the following dark period, and the sample branch output is similarily sampled. The dark output is subtracted from both stored branch sums yielding dark corrected branch values. The entire sampling sequence is repeated for the next eleven chopper cycles, the corresponding branch results are averaged, stored and divided to give a reflectance value.

As noted above to use the instrument the lens 14 is aligned with the reference board, the mirror 10 with the object to be measured and a scan of wave lengths is carried out. The board should, of course be subject to the same illumination as the object to be measured. The computed values are corrected by the stored calibration data to give the reflectance of the sample seen relative to the reference board, independent of changes of ambient light during the measurement. This is because the sample and reference are measured for a particular wavelength and very little time elapses between the two measurements. Should the ambient light change for measurements at another wavelength this will have no real effect since it is the ratio between measurements of a particular wavelength which are of interest. These ratios can be plotted against wave length on an XY recorder for immediate field evaluation. A facility for recording the stored data on a digital tape cassette for later processing by computer programme which contains corrections for the known reflectance spectrum of the reference board can also be provided. This allows determination of absolute spectral reflectance curves and colorimetric parameters such as the CIE color-coordinates x, y and Y(%).

It will therefore be evident that the present invention provides an optical system for a spectrophotometer which uses ambient light and which can readily be assembled together with the remainder of the spectrophotometer whilst in the field. Results may therefore be plotted in the field and can be assessed to ensure that the results do accord with what would be expected before the results are fully analysed by computer or the like.

The present system also allows the light sampled by the monochromator to be easily and unambiguously identified and at the same time provides a double-beam capability for accurate reflectance measurement independently of the level of illumination.

Whilst we have described in the foregoing description preferred forms of our invention, we do not wish to be limited to the positive terms employed therein, since it will be understood that many modifications and/or alterations may be made without departing from the spirit and scope of the present invention.

We claim:

1. An optical system for a spectrophotometer said system having a first optical branch for forming an image from a sample and a second branch for forming an image from a reference target, a splitter means for directing a portion of said image formed by the first optical branch to an eye piece and to a detecting means and for directing a portion of said image formed by said second optical branch to said eye piece and to said detecting means and a shutter means for sequentially allowing the image formed by the first branch to be received by said splitter means and the image formed by said second branch to be received by said splitter means.

2. The optical system of claim 1 wherein the splitter means comprises a segmented mirror, the segmented mirror having a slit therein and portions which are reflective and other portions which are transparent so that the portion of the image in the first branch passes through said slit and is received at the detecting means and the reflective portion of the mirror directs a part of the image in the first branch to the eye piece, and a portion of the image in the second branch passes through the transparent parts of the mirror to the eye piece and the remainder of the image is reflected to the detecting means by the reflective part of the mirror.

3. The optical system according to claim 1 or 2 wherein one of the branches includes a mirror for reflecting the image through an objective lens to the splitter means and the other branch includes an objective lens for directing the image to the splitter means.

4. The optical system according to claim 1 wherein the shutter means is a generally conical rotatable shutter having an aperture in a portion thereof, so that as the shutter rotates it allows the image in the first and second branches to pass sequentially through said aperture to the splitter means, with a period of darkness between each sequential image passed to the splitter means.

5. The optical system according to claim 4 wherein said splitter means projects into the generally conical shutter.

6. A system for collecting light from separate sources said system comprising
    a first telescope means,
    a second telescope means, said first and second telescope means having a common primary focus,
    a splitter means disposed at said common primary focus,
    said first and second telescope means having separate first parts and common second parts,
    a shutter means disposed to allow light entering each telescope means to be received sequentially at the splitter means, so that some light entering the first part of the first telescope means is directed through the common second part of the first and second telescope by the splitter means and some of the light is directed to a secondary location by the splitter means and wherein some of the light entering the first part of the second telescope means is directed through the common second part of the first and second telescope means by the splitter means and some light is directed to said secondary location.

7. A system according to claim 6, wherein the first telescope means includes an objective lens, an erecting lens and an eye piece and the second telescope means includes a second objective lens, said erecting lens and said eye piece such that light entering said first and second telescope means can be viewed in mosaic form through said eye piece.

8. A system according to claim 6, wherein the splitter means comprises a mirror having portions which are reflective and portions which allow light to pass through the mirror.

9. A system according to claim 6 wherein the shutter means is a generally conical rotatable shutter having an aperture in a portion thereof such that when the shutter rotates light entering the first parts of the first and second telescope means is allowed to pass sequentially through the aperture to said splitter means.

10. A system according to claim 6 wherein detecting and analysing means is located at said second location for detecting and analysing light received by the first part of the first and second telescope means and which is directed to the second location by the splitter means.

* * * * *